(12) United States Patent
Anderson et al.

(10) Patent No.: US 7,025,370 B2
(45) Date of Patent: Apr. 11, 2006

(54) TRAILER HITCH HEAD AND METHOD OF MANUFACTURING

(75) Inventors: Jed Anderson, Lindon, UT (US); Kenneth Mauerman, Orem, UT (US)

(73) Assignee: Progress Mfg. Inc., Provo, UT (US)

( * ) Notice: Subject to any disclaimer, the term of this patent is extended or adjusted under 35 U.S.C. 154(b) by 0 days.

(21) Appl. No.: 10/950,144

(22) Filed: Sep. 24, 2004

(65) Prior Publication Data
US 2006/0049612 A1    Mar. 9, 2006

Related U.S. Application Data

(63) Continuation of application No. 10/934,337, filed on Sep. 3, 2004, now abandoned.

(51) Int. Cl.
*B62D 53/00* (2006.01)

(52) U.S. Cl. .................................. 280/405.1; 280/455.1

(58) Field of Classification Search ............. 280/405.1, 280/406.1, 406.2, 407, 455.1, 484
See application file for complete search history.

(56) References Cited

U.S. PATENT DOCUMENTS

| | | |
|---|---|---|
| 3,021,154 A | 2/1962 | Hedgepeth |
| 3,347,561 A | 10/1967 | Hedgepeth |
| 3,441,291 A | 4/1969 | Morris, Jr. |
| 3,445,125 A | 5/1969 | Stewart |
| 3,731,950 A | 5/1973 | Burcham |
| 3,756,618 A | 9/1973 | Lewis |
| 3,801,133 A | 4/1974 | Thompson |
| 3,814,463 A | 6/1974 | Tunesi |
| 3,900,212 A | 8/1975 | Ewing |
| 4,033,601 A * | 7/1977 | Lindahl et al. .......... 280/490.1 |
| 4,053,174 A | 10/1977 | Guettler, Jr. |
| 4,198,073 A | 4/1980 | Olsen |
| 4,213,627 A * | 7/1980 | Thompson ............... 280/406.2 |
| 4,230,333 A | 10/1980 | Persyn |
| 4,253,680 A | 3/1981 | Albright et al. |
| 4,815,752 A | 3/1989 | Young et al. |
| 5,465,991 A * | 11/1995 | Kass et al. ................... 280/457 |
| 5,562,298 A * | 10/1996 | Kass et al. ............... 280/406.2 |
| 5,580,076 A | 12/1996 | DeRoule et al. |
| 5,725,231 A | 3/1998 | Buie |
| 5,868,414 A * | 2/1999 | McCoy et al. ........... 280/406.2 |
| 5,873,594 A * | 2/1999 | McCoy et al. ........... 280/491.5 |

(Continued)

OTHER PUBLICATIONS

Declaration of Jed Anderson Regarding Information Publicly Available Prior to Earliest Filling Date.

(Continued)

*Primary Examiner*—Tony Winner
(74) *Attorney, Agent, or Firm*—Clayton, Howarth & Cannon, P.C.

(57) ABSTRACT

A hitch head is disclosed as part of a trailer hitch. The hitch head may include an upper surface having an opening for receiving a stem of a hitch ball. A back side of the hitch head may include a pair of ridges for defining an area for receiving an attaching member for attaching the trailer hitch to a towing vehicle. The hitch head may also include a pair of weld recesses between the ridges for defining channels for receiving welds. The ridges and the recesses on the hitch head allow the attaching member to be positioned and welded to the hitch head in a more time efficient manner. The ridges and recess are also configured to reduce the amount of weld material required to weld the attaching member to the hitch head without reducing the strength of the welds.

25 Claims, 9 Drawing Sheets

U.S. PATENT DOCUMENTS

| | | | |
|---|---|---|---|
| 5,890,726 A | 4/1999 | McCoy et al. | |
| 5,984,341 A * | 11/1999 | Kass et al. | 280/455.1 |
| 6,182,997 B1 | 2/2001 | Ullrich et al. | |
| 6,419,257 B1 | 7/2002 | McCoy et al. | |
| 6,536,793 B1 | 3/2003 | Sargent | |
| 6,594,924 B1 | 7/2003 | Curtis | |
| 6,629,701 B1 * | 10/2003 | Colibert | 280/455.1 |
| 6,722,682 B1 * | 4/2004 | Valliere et al. | 280/405.1 |
| 6,860,501 B1 * | 3/2005 | Schmidt et al. | 280/455.1 |
| 2003/0042703 A1 | 3/2003 | Valliere et al. | |

OTHER PUBLICATIONS

Draw-Tite, Inc., Installation/Operation Instrucitons Weight Distributing Hitch Systems 3601, 3602, and 3603, May 15, 1997.

Hidden Hitch, Trunnion Bar Style Weight Distributing Hitch, at least as early as Jul. 2004.

REESE, Heavy-Duty Round Bar, at least as early as Jul. 2004.

REESE, Standard Trunnion Weight-Distributing, at least as early as Jul. 2004.

REESE, 26000 & 26001 Dual Cam Sway Control Parts, at least as early as Jul. 2004.

REESE, 26600 Friction Sway Control Parts, at least as early as Jul. 2004.

REESE, Dual Cam Sway Control, at least as early as Jul. 2004.

REESE, Strait-Line Hitch Kits, at least as early as Jul. 2004.

Progress Mfg. Inc., Eliminate Trailer Sway: The Original Equal-i-zer Sway Control Hitch, at least as early as Sep. 2, 2003.

REESE, Weight Distributing—Hi-Performance, at least as early as Jul. 2004.

REESE, Weight Distributing—Heavy Duty Round Bar, at least as early as Jul. 2004.

Competitor spring bar operating instructions, at least as early as Jul. 2004.

PULLRITE advertisement, at least as early as Jul. 2004.

Hensley Arrow advertisement, at least as early as Jul. 2004.

Eaz-Lift Adjustable Weight Distributing Hitch Parts and Quality S Weight Distributing Hitches and Parts, at least as early as Jul. 2004.

ACAR Sway Control W/Surge Brake System, Eaz-Lift Sway Controls, and Eaz-Lift Sway Control Parts and Accessories, at least as early as Jul. 2004.

Eaz-Lift Weight Distributing Hitches and Eaz-Lift Weld Together Weight Distributing Hitch Parts, at least as early as Jul. 2004.

Tow Hitch of Canada, Twin Anti-Sways Car and Trailer Handle as One Unit Tow Hitch, at least as early as Jul. 2004.

* cited by examiner

TRAILER HITCH HEAD AND METHOD OF MANUFACTURING

CROSS-REFERENCE TO RELATED APPLICATIONS

This application is a continuation of U.S. patent application Ser. No. 10/934,337, filed Sep. 3, 2004, now abandoned, entitled "TRAILER HITCH HEAD AND METHOD OF MANUFACTURING," which application is hereby incorporated by reference herein in its entirety, including but not limited to those portions that specifically appear hereinafter, the incorporation by reference being made with the following exception: In the event that any portion of the above-referenced application is inconsistent with this application, this application supercedes said above-referenced application.

STATEMENT REGARDING FEDERALLY SPONSORED RESEARCH OR DEVELOPMENT

Not Applicable.

BACKGROUND

1. The Field of the Invention

The present disclosure relates generally to trailer hitches, and more particularly, but not necessarily entirely, to hitch heads having features that allow for efficient methods of manufacturing.

2. Description of Related Art

Various different types of trailer hitches are known in the art for attaching trailers to towing vehicles. One of the most common types of towing systems utilizes a ball hitch. Typical ball hitches have a generally spherical shaped ball with a stem or threaded rod extending from a base of the ball. The threaded rod may be configured to engage a hitch head mounted on the towing vehicle using a threaded receiver or ball hitch fitting. A trailer coupling member, positioned on a front of the trailer tongue, may engage the ball hitch in a loose friction fit, and may be secured to the ball in preparation for towing. Some hitches may also have load equalizing systems to distribute loads and allow the towing vehicle and trailer to remain level. Other mechanisms may also be used in association with a trailer hitch to reduce side sway of the trailer. U.S. Pat. No. 3,347,561 (granted Oct. 17, 1967 to Hedgepeth) and U.S. Pat. No. 3,021,154 (granted Feb. 13, 1962 to Hedgepeth) disclose exemplary trailer hitch mechanisms known in the art.

Trailer hitch components, including the hitch head, must be formed to have considerable strength characteristics to withstand the forces exerted by the vehicle and the trailer as the trailer is towed. For example, trailer hitches may be subjected to substantial loads by the trailer including jarring forces as the trailer is moved. Weight distribution forces and anti-sway forces may also be applied to the hitch by accessory components which also require the hitch to be formed in a sturdy manner.

Additional components are commonly welded to the hitch head. Considerable weld material may be required to form a weld of suitable strength. Moreover, it may be time consuming and difficult to properly position components to be welded to the hitch head. Accordingly, the features and methods of manufacturing the known hitch heads have resulted in costly and inefficient production of hitch heads.

Thus, despite the advantages offered by the prior art hitch systems, the prior art is characterized by several disadvantages that are addressed by the present disclosure. The present disclosure minimizes, and in some aspects eliminates, the above-mentioned failures, and other problems, by utilizing the methods and structural features described herein.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
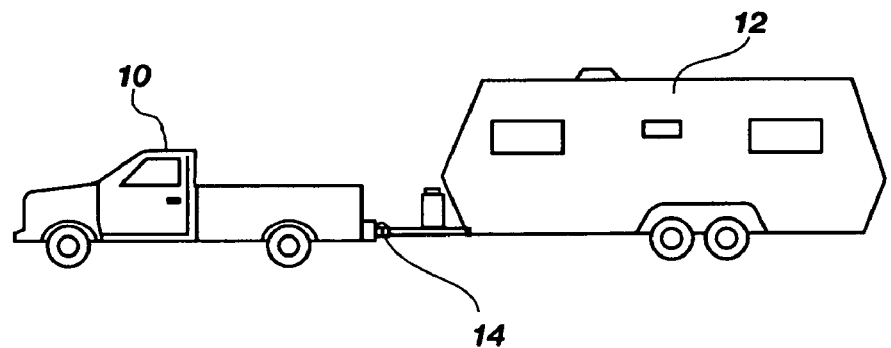
FIG. 1 is a side view of a towing vehicle towing a trailer with a trailer hitch.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

The publications and other reference materials referred to herein to describe the background of the disclosure, and to provide additional detail regarding its practice, are hereby incorporated by reference herein in their entireties, with the following exception: In the event that any portion of said reference materials is inconsistent with this application, this application supercedes said reference materials. The reference materials discussed herein are provided solely for their disclosure prior to the filing date of the present application.

Nothing herein is to be construed as a suggestion or admission that the inventors are not entitled to antedate such disclosure by virtue of prior disclosure, or to distinguish the present disclosure from the subject matter disclosed in the reference materials.

It must be noted that, as used in this specification and the appended claims, the singular forms "a," "an," and "the" include plural referents unless the context clearly dictates otherwise. Also, as used herein, the terms "comprising," "including," "containing," "characterized by," and grammatical equivalents thereof are inclusive or open-ended terms that do not exclude additional, unrecited elements or method steps.

Figure 2:
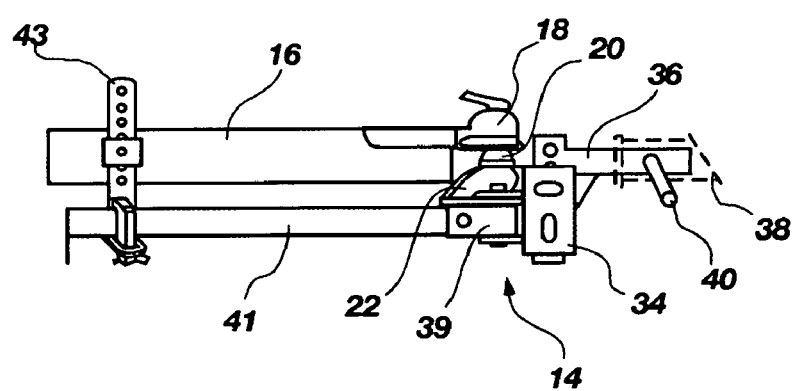
FIG. 2 is a side view from a direction opposite that of FIG. 1, of a trailer hitch attached to a break-away portion of a trailer tongue.

Referring now to FIG. 1, a side view is shown of a towing vehicle 10 towing a trailer 12 with a trailer hitch 14. It will be understood that the towing vehicle 10 may be any variety of vehicle known in the art, such as a car or truck, or any variety of off-road vehicle, for example. Likewise, the principles of the present disclosure may be utilized with any variety of trailer 12 known in the art, such as camping trailers, boat trailers or cargo trailers, for example. As shown in FIG. 2 the trailer 12 may include a tongue 16 extending at a forward end of the trailer 12. A coupler 18 may be located on an end of the tongue 16 for receiving a ball 20 of the hitch 14, in a manner known in the art.

Figure 3:
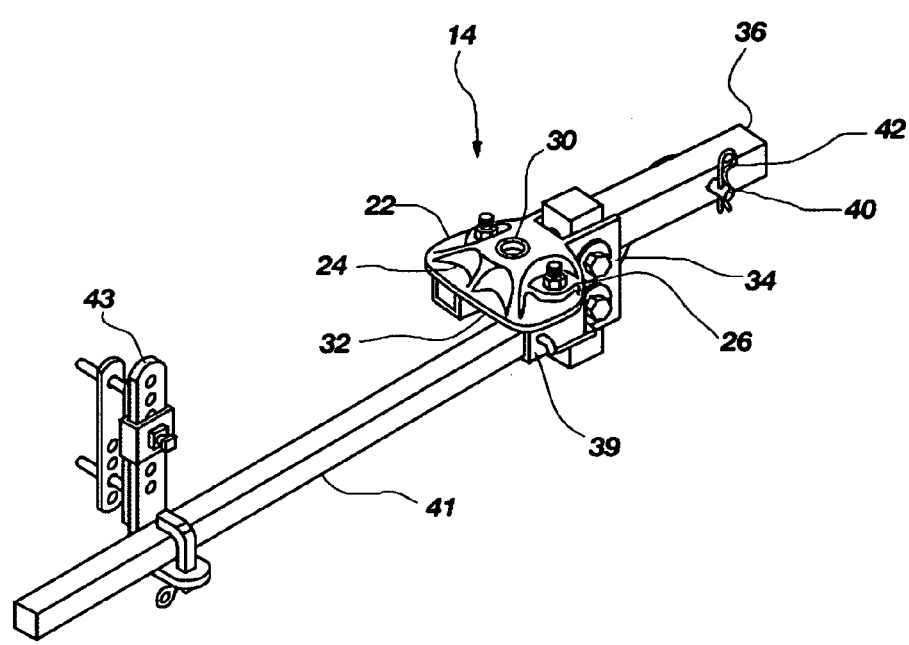
FIG. 3 is a perspective view of a portion of the trailer hitch of FIG. 2.

Referring to FIGS. 2 and 3, the hitch 14 may include a hitch head 22. The hitch head 22 may include a front side 24 for facing the trailer 12, a back side 26 for facing the towing vehicle 10, an upper side 28 having an opening 30 for receiving a stem of a hitch ball 20, and a lower side 32. Through bores 31 may extend from the upper side 28 to the lower side 32 for receiving bolts or other fastening mechanisms to attach the hitch head 22 to other structures. The back side 26 of the hitch head 22 may include an attachment member 34 for removably attaching a hitch shank 36. The attachment member 34 may be formed of a substantially "U" shaped channel member having openings for receiving bolts or other such fasteners to attach the hitch shank 36. It will be understood that the hitch shank 36 may be attached to a vehicle receiver 38 as shown in dashed lines in FIG. 2. An attachment mechanism such as a hitch pin 40 and a clip 42 may be used to secure the hitch shank 36 to the receiver 38.

A pair of sockets 39 may also be attached to the hitch head 22 on the lower side 32 for receiving spring arms 41. It will be understood that only a single spring arm 41 is shown in FIG. 3 for purposes of clarity. However, it will be appreciated that two spring arms 41 may be used with the hitch 14. An "L" bracket 43 may be used to attach the spring arm 41 to the tongue 16 of the trailer 12. As is known in the art, the weight of the trailer 12 may cause the back end of the towing vehicle 10 to sink and the front end of the towing vehicle 10 to raise. The spring arms 41 may be used to place an upward force on the hitch head 22 to equalize the distribution of the load and allow the towing vehicle 10 and trailer 12 to be more level. The spring arms 41 may also be beneficial for reducing sway of the trailer 12.

It will be understood that various of the features discussed above may be used in combination with the hitch head 22, and that the hitch head 22 may be used without all of the features discussed above. For example, in some situations, the hitch head 22 may be used without spring arms 41, or the spring arms 41 may have various different configurations within the scope of the present disclosure. Similarly, the "L" bracket 43 or hitch shank 36 may not be necessary in some embodiments, or they may have various different configurations.

Figure 4:
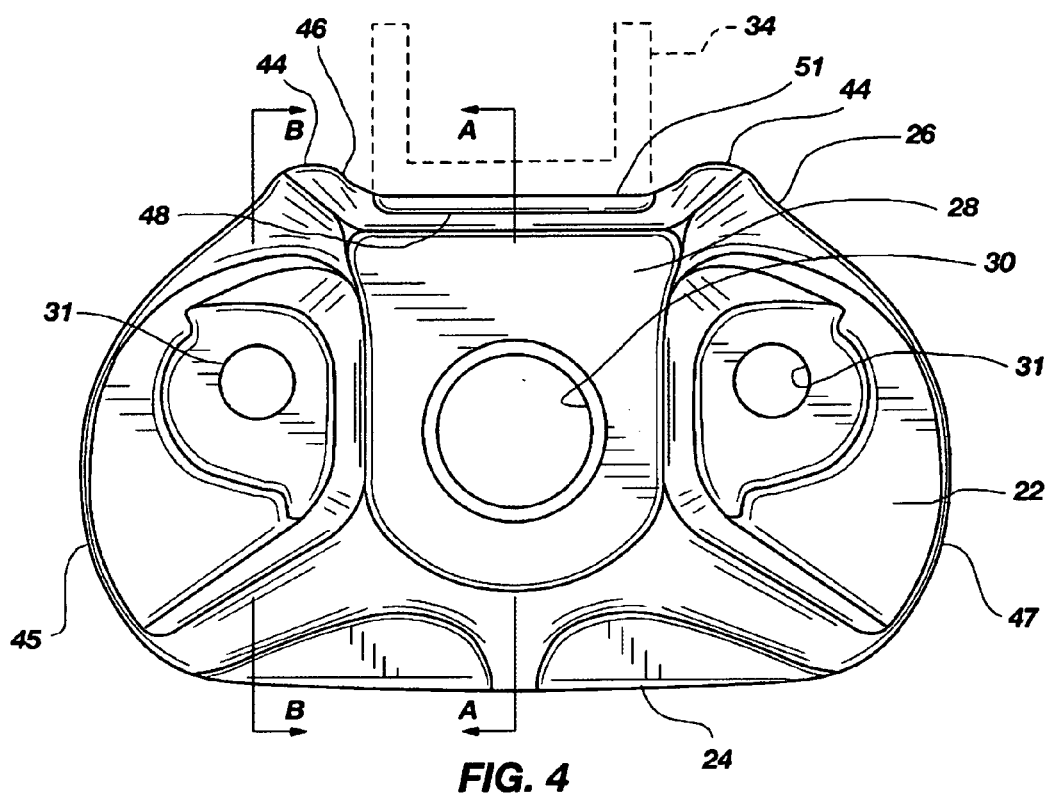
FIG. 4 is a top view of a hitch head.
Figure 5:
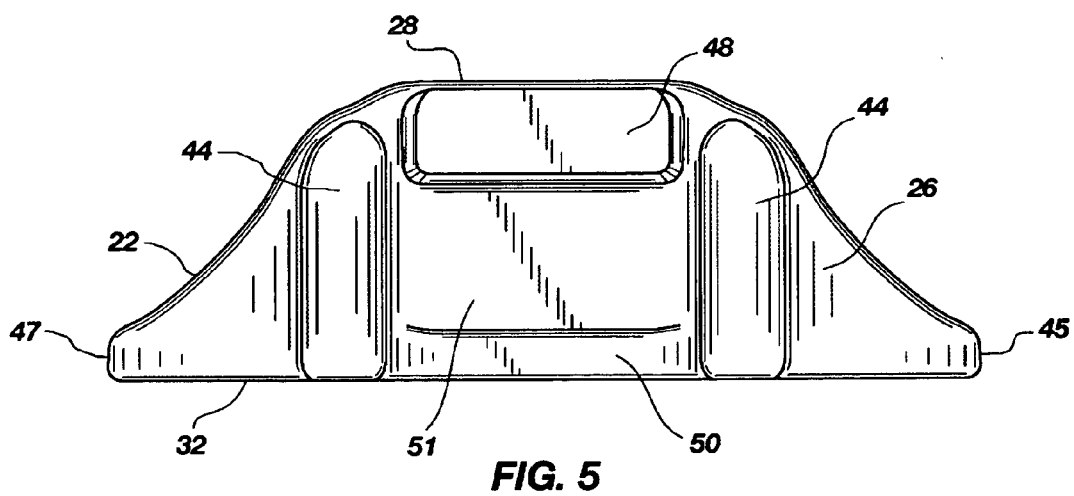
FIG. 5 is a back side view of the hitch head of FIG. 4.
Figure 6:
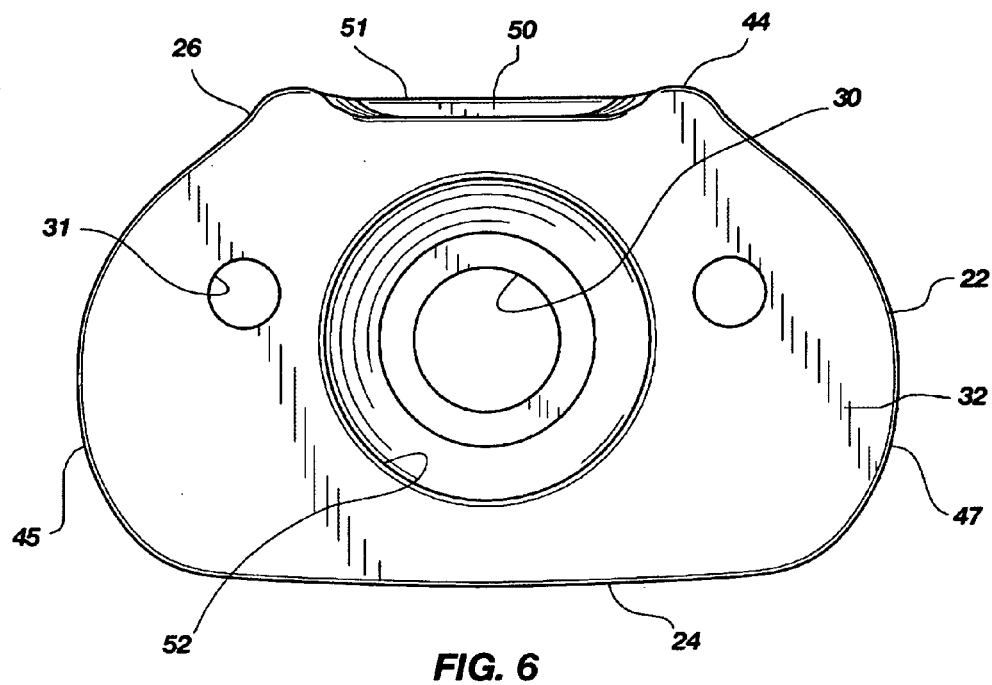
FIG. 6 is a bottom view of the hitch head of FIG. 4.
Figure 7:
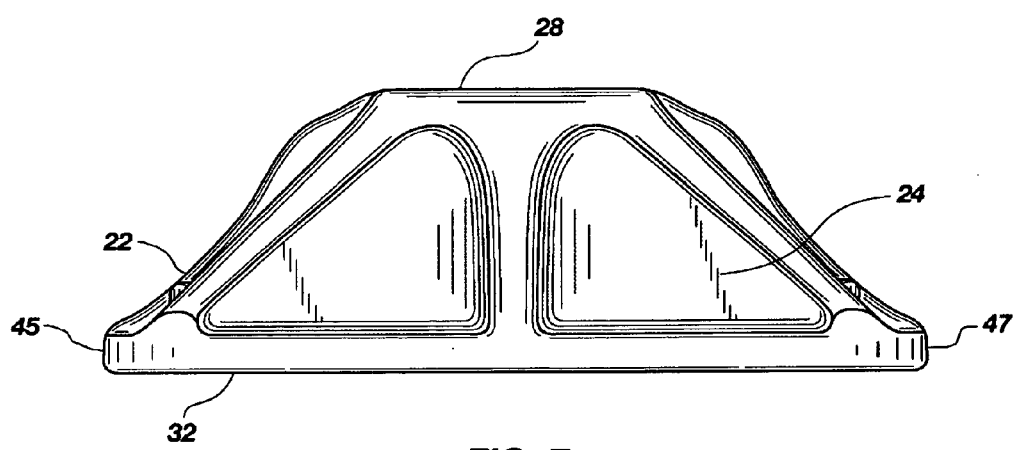
FIG. 7 is a front side view of the hitch head of FIG. 4.

Referring now to FIG. 4, a top view of a hitch head 22 is shown. The back side 26 of the hitch head 22 may include at least one ridge 44 extending in an upright direction. In one embodiment, the hitch head 22 may include first and second ridges 44 substantially parallel to each other and spaced apart to define a space for receiving an attachment member 34, as shown in dashed lines. The ridges 44 may extend from the lower side 32 to the upper side 28 to improve the union between the attaching member 34 and the hitch head 22.

One embodiment of the present disclosure may include a first ridge 44 that is spaced apart from the second ridge 44 a distance ranging from approximately 30 to 50 percent of a length of the hitch head 22 from a first end 45 to a second end 47. More specifically, an embodiment of the present disclosure may include a first ridge 44 that is spaced apart from the second ridge 44 a distance of approximately 37 percent of the length of the hitch head 22.

It will be understood that the ridges 44 may be sized and positioned such that the attaching member 34 may be easily positioned in the proper location for being attached to the hitch head 22. Moreover, the ridges 44 may be shaped to reduce the amount of weld material, as shown by weld 46 in dashed lines, required to weld the attaching member 34 to the hitch head 22. In one embodiment of the present disclosure, the weld 46 may be placed in a gap, dimensioned approximately ⅜ inch, between the attachment member 34 and the ridges 44. Prior art welds have been required ranging from approximately ½ inch to ¾ inch. Accordingly, the amount of weld material required to weld the attaching member 34 to the hitch head 22 in accordance with the principles of the present disclosure may be reduced by approximately fifty percent as compared to prior art welds. It will be appreciated that the reduced weld material may be possible due to the reduced volume of space between the attaching member 34 and the ridges 44 as compared to an attaching member and a substantially flat surface without the ridges 44. Importantly, the strength of the weld 46, though smaller than welds in prior embodiments, is not diminished such that a very strong connection may be maintained between the hitch head 22 and the attaching member 34.

The size and shape of the ridges 44 may also aid in producing a high quality hitch 14 having an aesthetically pleasing appearance, since the ridges 44 may form a gage for the size of the required weld. Previously, the weld was difficult to control and finish in the correct size. The ridges 44 may allow the welder to terminate the weld at the crest of the ridge 44 which may improve the appearance of the finished product, and increase the consistency of the weld quality. The angle on the top and bottom of the ridges 44 may provide a proper backing for corner welds at the corners of the attaching member 34 such that even at the corners, the welds can be tied into the hitch head 22 in a more aesthetically pleasing manner and with the proper weld size.

Also, the time required to position the attaching member 34 on the hitch head 22 may be greatly reduced since the ridges 44 may facilitate orientation and alignment of the attaching member 34. The reduced time in positioning the attaching member with respect to the hitch head 22 may improve the manufacturing efficiency and thereby assist in reducing the cost of the hitch 14.

To further assist the welder in achieving a proper weld penetration, location and size, recesses including an upper recess 48 and a lower recess 50 may be formed on the back side 26 of the hitch head 22. The upper recess 48 may be formed starting at the upper surface 28 and extending downward to an upper contact area with the attaching member 34. Similarly the lower recess 50 may be formed starting at the lower surface extending up to a lower contact area with the attaching member 34. The upper recess 48 and the lower recess 50 may extend between the ridges 44 in a lateral direction substantially perpendicular to the ridges 44.

A lateral projection 51 may also be formed on the back side 26 of the hitch head 22. The lateral projection 51 may be defined at least in part by the upper recess 48 and the lower recess 50, such that the upper recess 48 is spaced apart from the lower recess 50 by the lateral projection 51. In one embodiment, the upper recess 48 and lower recess 50 may extend in a substantially parallel orientation such that a majority portion of the lateral projection 51 may be configured to be a substantially rectangular member. It will be understood, however, that the recesses may be oriented in other configurations within the scope of the present disclosure.

In one embodiment of the present disclosure, the lateral projection 51 may have a height between the lower recess 50 and the upper recess 48 that may be within a range of approximately 40 to 60 percent of a maximum height of the hitch head 22 from the lower side 32 to the upper side 28. More specifically, an embodiment of the present disclosure may have a height between the lower recess 50 and the upper recess 48 that may be approximately 48 percent of the maximum height of the hitch head 22 from the lower side 32 to the upper side 28.

The upper recess 48 and the lower recess 50 may assist the welder in forming a consistent weld between the hitch head 22 and the attaching member 34 to thereby improve the weld quality. Moreover, the recesses 48, 50 may allow the welder to decrease the time required to weld the attaching member 34 to the hitch head 22. Similar to the ridges 44, the recesses 48, 50 may be used to reduce the amount of weld material required without reducing the weld strength. Moreover, the recesses 48, 50 may allow the attaching member 34 to be welded to the hitch head 22 in an efficient and aesthetically pleasing manner.

Figure 8:
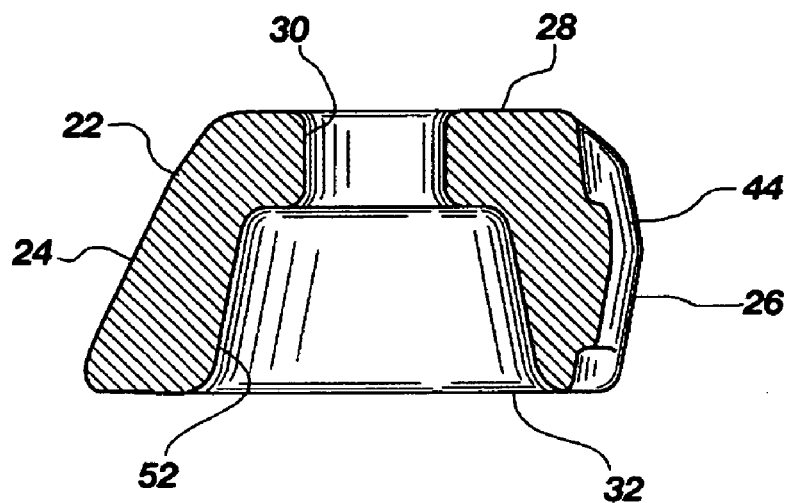
FIG. 8 is a side cross sectional view of the hitch head of FIG. 4 taken along line A—A.

Referring now to FIG. 8, which shows a cross sectional view of the hitch head 22 taken along line A—A in FIG. 4, one embodiment of the hitch head 22 may include a hollow cavity 52 to reduce the amount of material in and weight of the hitch head 22. However, it will be understood that other embodiments of the hitch head 22 may be solid. The cavity 52 may join with the opening 30 to define a through cavity extending from the upper side 28 to the lower side 32.

Figure 9:
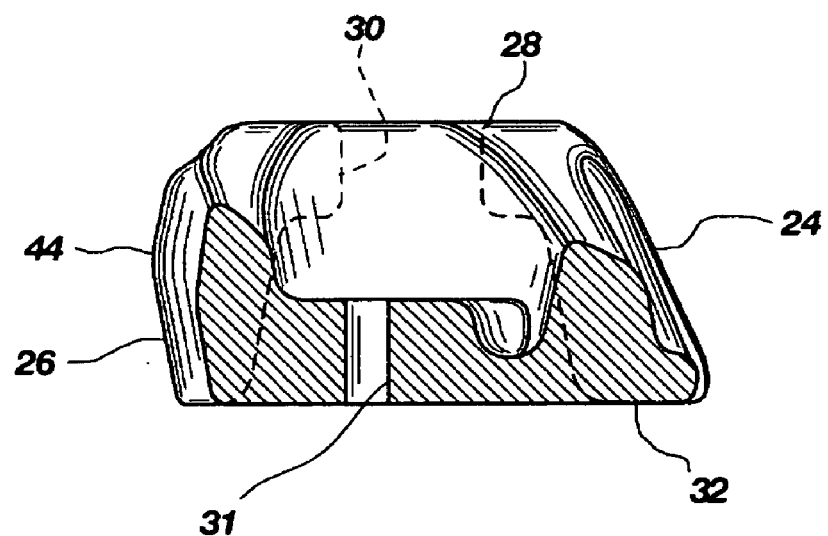
FIG. 9 is a side cross sectional view of the hitch head of FIG. 4 taken along line B—B.
Figure 10:
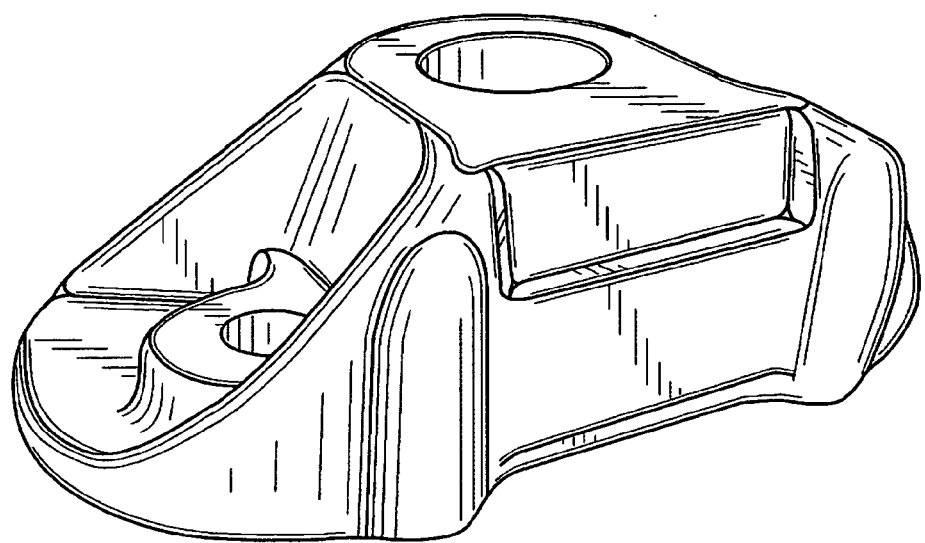
FIG. 10 is a perspective view of a hitch head.
Figure 11:
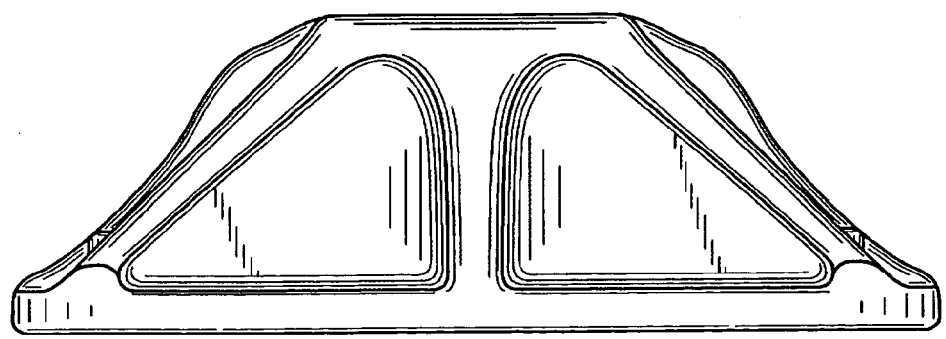
FIG. 11 is a front side view of the hitch head of FIG. 10.
Figure 12:
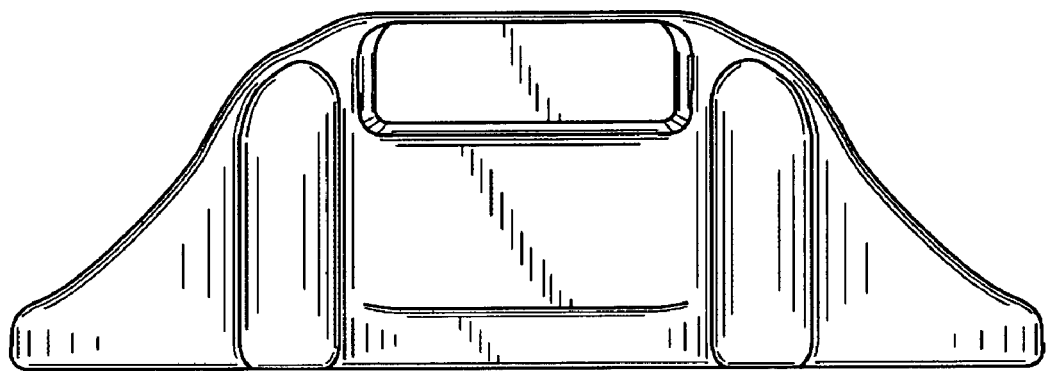
FIG. 12 is a back side view of the hitch head of FIG. 10.
Figure 13:
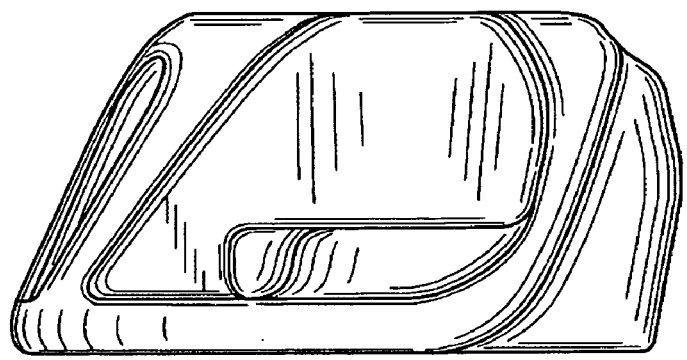
FIG. 13 is a right end view of the hitch head of FIG. 10.
Figure 14:
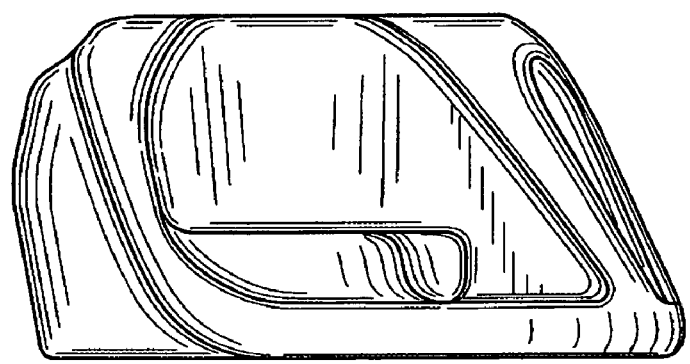
FIG. 14 is a left end view of the hitch head of FIG. 10.
Figure 15:
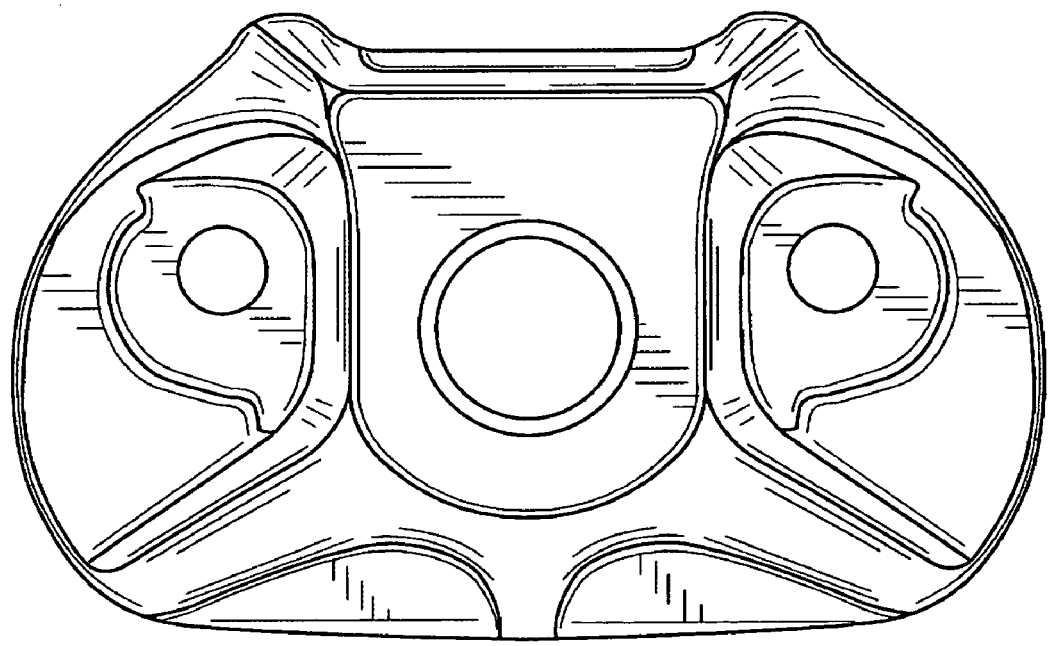
FIG. 15 is a top view of the hitch head of FIG. 10.
Figure 16:
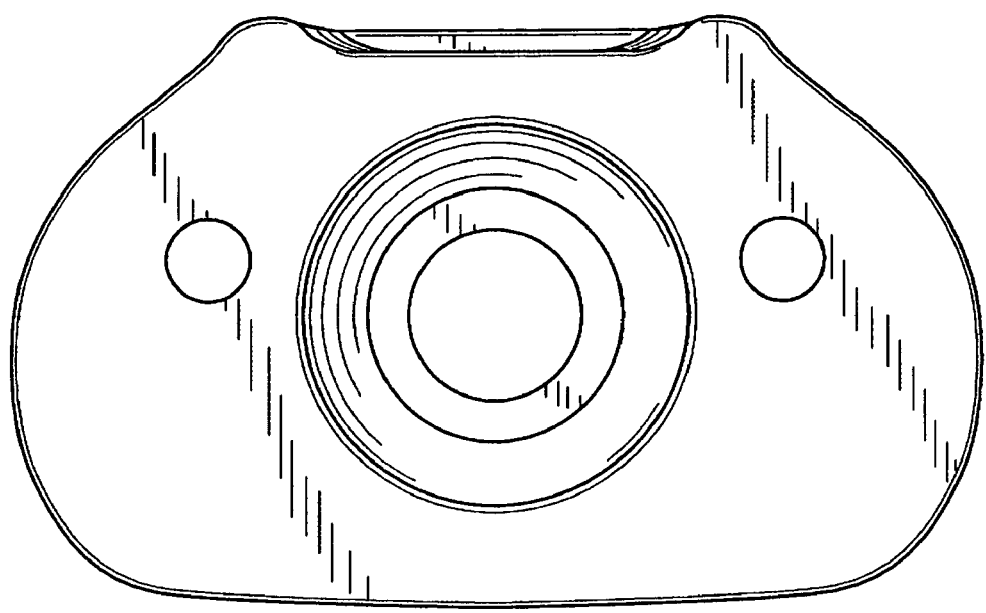
FIG. 16 is a bottom view of the hitch head of FIG. 10.

Also, as shown in FIG. 9, which shows a cross sectional view of the hitch head 22 taken along line B—B in FIG. 4, ends of the hitch head 22 may have reduced thickness. However, it will be understood that the hitch head 22 may have various different shapes and configurations within the scope of the present disclosure.

The hitch head 22 may be formed of steel or any other suitable material known in the art. Also, the hitch head 22 may be formed using any process known to those skilled in the art.

One exemplary method of forming the hitch head 22 may include a forging process in which billets of steel, such as round bars, for example, may be cut into lengths. The individual billets may be passed through a heater, such as an induction heater as is known in the art. The induction heater may be used to raise the temperature of the metal billets to a desired temperature for shaping the billets.

The billet may be transferred from the induction heater to a hammer device. Transferring the billets may be accomplished in a short period of time to maintain the billets at a high temperature. The hammer device may be used to hit the billet a number of times, for initial shaping of the billets. It will be understood that various different number of hits with the hammer may be required depending upon factors such as the weight of the hammer and temperature of the billets, for example.

The billet may then pass to a trim operation for trimming the part to the desired shape. This step may also be done quickly. The parts may then be individually cooled on a conveyor and may not be allowed to drop off the conveyor until they are adequately cooled. Various methods for determining the temperature of the parts may be used.

Once the parts have adequately cooled, they may be dropped off conveyor into a bin or tub. When the tub has the desired number of parts contained therein, it may be allowed to air cool. The cooled parts may then be jet blasted in a barrel.

The cold parts may then be pierced to form the opening 30, dimensioned at approximately 1 1\4 inch, for example, or any other suitable dimension. Also, the two through bores 31 may be drilled, having a dimension of approximately $21/32$ inch, for example, or other desired dimension. The U shaped attachment channel member may also be welded to the hitch head 22, and the hitch head 22 may be cleaned and painted.

It will be appreciated that the method of forming the hitch head 22 described above, may provide a hitch head 22 having desirable hardness, strength, durability and other characteristics. However, it will be understood that other methods may be used to form the hitch head 22 within the scope of the present disclosure. Accordingly, the method described above is for illustrative purposes only, and is not intended to be limiting of the potential manufacturing steps that may be used to form the hitch head 22.

Additional views of a hitch head in accordance with the principles of the present disclosure are presented in FIGS. 10–16.

It will be appreciated that the structure and apparatus disclosed herein is merely one example of a means for receiving a weld, and it should be appreciated that any structure, apparatus or system for receiving a weld which performs functions the same as, or equivalent to, those disclosed herein are intended to fall within the scope of a means for receiving a weld, including those structures, apparatus or systems for receiving a weld which are presently known, or which may become available in the future. Anything which functions the same as, or equivalently to, a means for receiving a weld falls within the scope of this element.

It will be appreciated that the structure and apparatus disclosed herein is merely one example of a means for positioning an attaching member, and it should be appreciated that any structure, apparatus or system for positioning an attaching member which performs functions the same as, or equivalent to, those disclosed herein are intended to fall within the scope of a means for positioning an attaching member, including those structures, apparatus or systems for positioning an attaching member which are presently known, or which may become available in the future. Anything which functions the same as, or equivalently to, a means for positioning an attaching member falls within the scope of this element.

In accordance with the features and combinations described above, a useful method of connecting an attaching member to a hitch head includes the steps of:
 (a) defining a position on the hitch head for receiving the attaching member;
 (b) defining a weld path on said hitch head;
 (c) joining the attaching member to the position on the hitch head; and (d) welding the attaching member to the hitch head along the weld path.

Those having ordinary skill in the relevant art will appreciate the advantages provide by the features of the present disclosure. For example, it is a feature of the present disclosure to provide a hitch head which is simple in design and manufacture. Another feature of the present disclosure is to provide such a hitch head that reduces the amount of weld material required to weld an attaching member to the hitch head. It is a further feature of the present disclosure, in accordance with one aspect thereof, to provide a hitch head having an aesthetically pleasant appearance. It is a further feature of the present disclosure to provide a hitch head that allows for easy positioning of the attaching member with respect to the hitch head and that reduces the time required to weld the attaching member to the hitch head. It is an additional feature of the present disclosure to provide a hitch head that allows a strong weld to be produced between the hitch head and the attaching member.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A hitch head for attaching to a towing vehicle for towing a trailer, said hitch head comprising:
    a front side for facing said trailer, a back side for facing said towing vehicle, an upper side having an opening for receiving a stem of a hitch ball, and a lower side;
    wherein said back side comprises at least one upright ridge extending from said lower side to said upper side for connecting to an attachment member such that when said attachment member is positioned with respect to said at least one upright ridge, said attachment member is aligned for being welded to said hitch head and said at least one upright ridge; and
    a pair of through bores for receiving bolts extending from said upper side to said lower side.

2. The hitch head of claim 1, wherein said at least one upright ridge comprises two upright ridges.

3. The hitch head of claim 2, wherein said two upright ridges are spaced apart and substantially parallel to each other.

4. A hitch head for attaching to a towing vehicle for towing a trailer, said hitch head comprising:
    a front side for facing said trailer, a back side for facing said towing vehicle, an upper side having an opening for receiving a stem of a hitch ball, and a lower side;
    wherein said back side comprises at least one upright ridge extending from said lower side to said upper side for connecting to an attachment member such that when said attachment member is positioned with respect to said at least one upright ridge, said attachment member is aligned for being welded to said hitch head and said at least one upright ridge; and
    wherein said back side comprises a recess extending in a lateral direction such that when said attachment member is positioned on said back side of said hitch head, said recess is configured to receive a weld for welding said attachment member to said hitch head.

5. The hitch head of claim 4, wherein said recess is an upper recess, and said hitch head further comprises a lower recess.

6. The hitch head of claim 5, wherein said upper recess and said lower recess are spaced apart from each other and extend in a substantially parallel orientation.

7. The hitch head of claim 4, wherein said at least one upright ridge comprises two upright ridges, and wherein said recess extends between said two upright ridges.

8. A hitch head for attaching to a towing vehicle for towing a trailer, said hitch head comprising:
    a front side for facing said trailer, a back side for facing said towing vehicle, an upper side having an opening for receiving a stem of a hitch ball, and a lower side;
    wherein said back side comprises at least one upright ridge for positioning an attachment member; and
    wherein said back side further comprises a recess for receiving a weld to attach said attachment member to said hitch head.

9. A hitch head for attaching to a towing vehicle for towing a trailer, said hitch head comprising:
    a front side for facing said trailer, a back side for facing said towing vehicle, an upper side having an opening for receiving a stem of a hitch ball, and a lower side;
    wherein said back side comprises a recess extending in a lateral direction such that when an attachment member is positioned on said back side of said hitch head, said recess is configured to receive a weld for welding the attachment member to said hitch head.

10. The hitch head of claim 9, wherein said back side comprises at least one upright ridge for positioning said attachment member such that when said attachment member is positioned against said at least one upright ridge, said attachment member is aligned in position for being welded to said hitch head.

11. The hitch head of claim 10, wherein said at least one upright ridge comprises two upright ridges.

12. The hitch head of claim 11, wherein said two upright ridges are spaced apart and substantially parallel to each other.

13. The hitch head of claim 9, wherein said recess is an upper recess, and said hitch head further comprises a lower recess.

14. The hitch head of claim 13, wherein said upper recess and said lower recess are spaced apart from each other and extend in a substantially parallel orientation.

15. The hitch head of claim 10, wherein said at least one upright ridge comprises two upright ridges, and wherein said recess extends between said two upright ridges.

16. The hitch head of claim 9, further comprising a pair of through bores for receiving bolts extending from said upper side to said lower side.

17. A hitch head for attaching to a towing vehicle for towing a trailer, said hitch head comprising:
- a front side for facing said trailer, a back side for facing said towing vehicle, an upper side having an opening for receiving a stem of a hitch ball, and a lower side;
- wherein said hitch head comprises means for positioning an attaching member and means for receiving a weld to facilitate welding of said attaching member to said hitch head; and
- wherein said means for receiving said weld comprises an upper recess and a lower recess.

18. The hitch head of claim 17, wherein said means for positioning said attachment member and said means for receiving said weld are positioned on said back side of said hitch head.

19. The hitch head of claim 17, wherein said means for positioning said attachment member comprises a pair of ridges.

20. A hitch head for attaching to a towing vehicle for towing a trailer, said hitch head comprising:
- a front side for facing said trailer, a back side for facing said towing vehicle, an upper side having an opening for receiving a stem of a hitch ball, and a lower side;
- wherein said hitch head comprises a pair of through bores extending from said upper side to said lower side, said pair of through bores being configured for receiving bolts;
- wherein said hitch head defines a hollow cavity between said upper side and said lower side;
- wherein said back side of said hitch head comprises a first ridge extending in an upright direction and a second ridge spaced apart from said first ridge extending substantially parallel to said first ridge, said first ridge and said second ridge defining a space therebetween for receiving an attachment member for attaching said hitch head to a towing vehicle;
- said back side of said hitch head further comprising a lateral projection defined in part by an upper recess and a lower recess extending between said first ridge and said second ridge, said upper recess and said lower recess being spaced apart by the lateral projection and extending in a direction substantially parallel to each other and substantially perpendicular to said first ridge and said second ridge;
- wherein when said attachment member is positioned between said first ridge and said second ridge, said upper recess and said lower recess are configured to receive a weld for welding said attachment member to said hitch head.

21. The hitch head of claim 20, wherein the cavity is a through cavity.

22. The hitch head of claim 20, wherein a majority of the lateral projection defines a substantially rectangular member.

23. The hitch head of claim 20, wherein the attachment member comprises a substantially U shaped member.

24. The hitch head of claim 20, wherein said lateral projection has a height between said lower recess and said upper recess that is approximately 48 percent of a maximum height of said hitch head from said lower side to said upper side.

25. The hitch head of claim 20, wherein said first ridge is spaced apart from said second ridge a distance that is approximately 37 percent of a total length of said hitch head from a first end to a second end.

* * * * *